(12) United States Patent
Meserole et al.

(10) Patent No.: US 7,618,602 B2
(45) Date of Patent: Nov. 17, 2009

(54) PROCESS FOR REMOVING $SO_3/H_2SO_4$ FROM FLUE GASES

(75) Inventors: Frank B. Meserole, Austin, TX (US);
Robert E. Moser, Santa Cruz, CA (US);
James H. Wilhelm, Sandy, UT (US)

(73) Assignee: Codan Development LLC, Sandy, UT (US)

( * ) Notice: Subject to any disclaimer, the term of this patent is extended or adjusted under 35 U.S.C. 154(b) by 477 days.

(21) Appl. No.: 11/278,466

(22) Filed: Apr. 3, 2006

(65) Prior Publication Data
US 2007/0231230 A1    Oct. 4, 2007

(51) Int. Cl.
*B01D 53/40*    (2006.01)
*B01D 53/50*    (2006.01)

(52) U.S. Cl. ............... 423/210; 423/242.1; 423/243.01; 423/243.06; 423/243.08; 423/244.01; 423/244.07

(58) Field of Classification Search ............... 423/210, 423/242.1, 243.01, 243.06, 243.08, 244.01, 423/244.07
See application file for complete search history.

(56) References Cited

U.S. PATENT DOCUMENTS

| | | | | |
|---|---|---|---|---|
| 3,906,080 | A | * | 9/1975 | Gorin et al. ............ 423/243.09 |
| 4,696,805 | A | * | 9/1987 | Shinoda et al. ......... 423/243.03 |
| 5,085,843 | A | * | 2/1992 | Rasmussen et al. ..... 423/243.08 |
| 5,342,593 | A | | 8/1994 | Christiansen et al. |
| 5,435,980 | A | * | 7/1995 | Felsvang et al. ............ 423/210 |
| 6,126,910 | A | | 10/2000 | Wilhelm et al. |
| 6,803,025 | B2 | | 10/2004 | Meserole et al. |

* cited by examiner

*Primary Examiner*—Timothy C Vanoy
(74) *Attorney, Agent, or Firm*—Hartman & Hartman, P.C.; Gary M. Hartman; Domenica N. S. Hartman

(57) ABSTRACT

A process of using solutions containing thiosulfate and/or chloride salt reagents to remove $SO_3$ and $H_2SO_4$ acid gases from a flue gas. The solution is injected into a moving volume of flue gas to achieve a droplet size that enables the solution to dry on contact with the flue gas, generating dried particles of the reagent that react with the $SO_3$ and $H_2SO_4$ acid gases yielding a salt precipitate. $SO_2$ present in the flue gas may also be absorbed with the solution, with a subsequent reaction yielding bisulfite species that, upon drying of the droplet, react with the $SO_3$ and $H_2SO_4$ acid gases to form salts that are removed from the gas. The removal of these acid gases from a flue gas reduce corrosion of equipment used in coal or oil fired power plants downstream of the injection cite.

19 Claims, 2 Drawing Sheets

PROCESS FOR REMOVING $SO_3/H_2SO_4$ FROM FLUE GASES

BACKGROUND OF THE INVENTION

The present invention generally relates to processes for removing acidic gases from flue gases, such as the exhaust gases produced by coal and oil-fired utility and industrial plants.

Sulfuric acid mist can be a significant problem for coal or oil-fired power plants by causing corrosion inside the system as well as creating environmental concerns from emissions that exit the system. Gas-liquid contactors and absorbers, or scrubbers, are widely employed to remove sulfur dioxide ($SO_2$), hydrochloric acid (HCl), hydrofluoric acid (HF) and, to a much lesser extent, sulfur trioxide ($SO_3$) and/or sulfuric acid ($H_2SO_4$), from flue gases produced by utility and industrial plants. Scrubbers generally have a quench zone where a liquid media is brought into intimate contact with a flue gas to remove acidic gases by absorption. The process by which acidic gases are removed from flue gases in this manner is generally referred to as wet flue gas desulfurization (wet FGD).

Sulfur dioxide is typically present in flue gases produced by coal and oil-fired boilers at much higher concentrations than HCl, HF and $SO_3$. Removal of $SO_3$ and sulfuric acid vapors from such flue gases helps to reduce a visible plume produced as a result of the formation of a sulfuric acid mist in the quench zone of FGD systems. The average particle size of such a mist is generally in the submicron range, which is sufficiently small to enable the mist to penetrate most FGD scrubbers. Sulfuric acid emissions of as little as about 5 ppmv will often result in a visible plume. Therefore, it is desirable to remove $SO_3$ and $H_2SO_4$ from flue gases upstream of the FGD system. During the combustion of coal, most chlorides present in the coal are converted to HCl. The HCl in flue gases is removed very efficiently by $SO_2$ removal systems, and as a consequence can become highly concentrated in the scrubbing solutions. High concentrations of chlorides can interfere with the scrubber efficiency and lead to disposal problems. Therefore, the removal of HCl prior to the FGD system can also be beneficial in certain cases.

As a solution to the above, U.S. Pat. No. 6,126,910 to Wilhelm et al. and U.S. Pat. No. 6,803,025 to Meserole et al., incorporated herein by reference, teach the use of soluble sulfite/bisulfite solutions, such as sodium sulfite ($Na_2SO_3$), sodium bisulfite ($NaHSO_3$), potassium sulfite ($K_2SO_3.2HOH$), potassium bisulfite ($KHSO_3$) and mixtures thereof to remove $SO_3$ and other acidic gases from a flue gas without removing or decreasing the amount of sulfur dioxide also present in the flue gas. The process entails injecting (e.g., spraying) a concentrated solution containing a sulfite/bisulfite into the flue gas stream to react acidic gases (e.g., HCl, HF and/or $SO_3$) and form a reaction product, without reacting the sulfur dioxide. After removal of the acidic gas(es), sulfur dioxide can be removed from the flue gas farther downstream using conventional scrubbing techniques, which can be rendered more technically and/or economically desirable as a result of the absence of $SO_3$. According to Wilhelm et al., a soluble bisulfite salt such as sodium bisulfite selectively removes acidic gases such as HCl, HF and $SO_3$, but will not remove sulfur dioxide. Wilhelm et al. teach that sulfur dioxide can be removed with solid reagents such as sodium carbonate ($Na_2CO_3$) and lime (CaO). Meserole et al. teach that soluble carbonate salts and soluble bicarbonate salts, if injected as a fine mist, can react with $SO_2$ and upon drying form solid sulfite salts that react with $SO_3$ and $H_2SO_4$ and reform $SO_2$.

SUMMARY OF THE INVENTION

The present invention provides a process for removing acid gases, particularly $SO_3$ and $H_2SO_4$, from a flue gas upstream of a scrubbing process, such as of the type used with coal and oil-fired power plants. While soluble sulfites, bisulfites, carbonates, and bicarbonates have previously been taught by Wilhelm et al. and Meserole et al. to remove these acid gases, the present invention proposes the use of soluble thiosulfate and chloride salts as reagents for the removal of $SO_3$ and $H_2SO_4$ acid gases. According to the invention, by spraying a solution containing dissolved thiosulfates and/or chlorides using a suitable liquid spray dispersion technique, the particle size of the reagent can be controlled to achieve a complete dispersion of the solution capable of encapsulating flue gas particles, and by which the thiosulfate and/or chloride reagents are able to subsequently react with $SO_3$ and $H_2SO_4$.

According to a first aspect, the invention provides a process for the capture and subsequent removal of $SO_3$ and $H_2SO_4$ acid gases that are present in flue gases produced by coal and oil-fired power plants. The thiosulfate or chloride solution is injected as a spray that dries on contact with the flue gas, and the resulting dry salt particles are sufficiently small as to provide sufficient surface area to react with $SO_3$ and $H_2SO_4$ vapors present in the flue gas stream. The reaction generates solid sulfates that can be extracted by particulate control systems such as electrostatic precipitators (ESP) or bag houses.

The invention also provides a process for the capture and subsequent removal of $SO_3$ and $H_2SO_4$ acid gases that are present in flue gases through an initial reaction with $SO_2$. According to this aspect of the invention, injecting a thiosulfate or chloride solution spray is capable of absorbing $SO_2$, and the absorbed $SO_2$ then reacts with the thiosulfate or chloride to form sulfite/bisulfite species in the spray droplet that undergo the reactions taught by Wilhelm et al. Upon drying, the sulfite/bisulfite reacts with $SO_3$ and $H_2SO_4$ acid gases prior to evaporation and precipitation of the extractable salts. Particulate control systems are used to extract dried sulfate compounds.

The invention can be specifically applied to coal and oil-fired power plants to eliminate or at least reduce acid gas plumes that form when scrubbed gases are exposed to atmosphere as they exit the stack of a power plant. The invention also provides various other advantages as a result of removing $SO_3$ and $H_2SO_4$ acid gases early in a FGD process. For example, corrosion of downstream equipment, such as an air preheater, the FGD scrubber, and stack, can be minimized. Furthermore, because of a reduced threat of acidic vapors condensing on equipment surfaces, heating of the boiler system can be reduced or eliminated. The precipitation of the acid gases to salts achieved with this invention helps bind fly ash typically suspended in flue gases, and thereby facilitates fly ash removal prior to FGD.

Other objects and advantages of this invention will be better appreciated from the following detailed description.

DETAILED DESCRIPTION OF THE INVENTION

Figure 1:
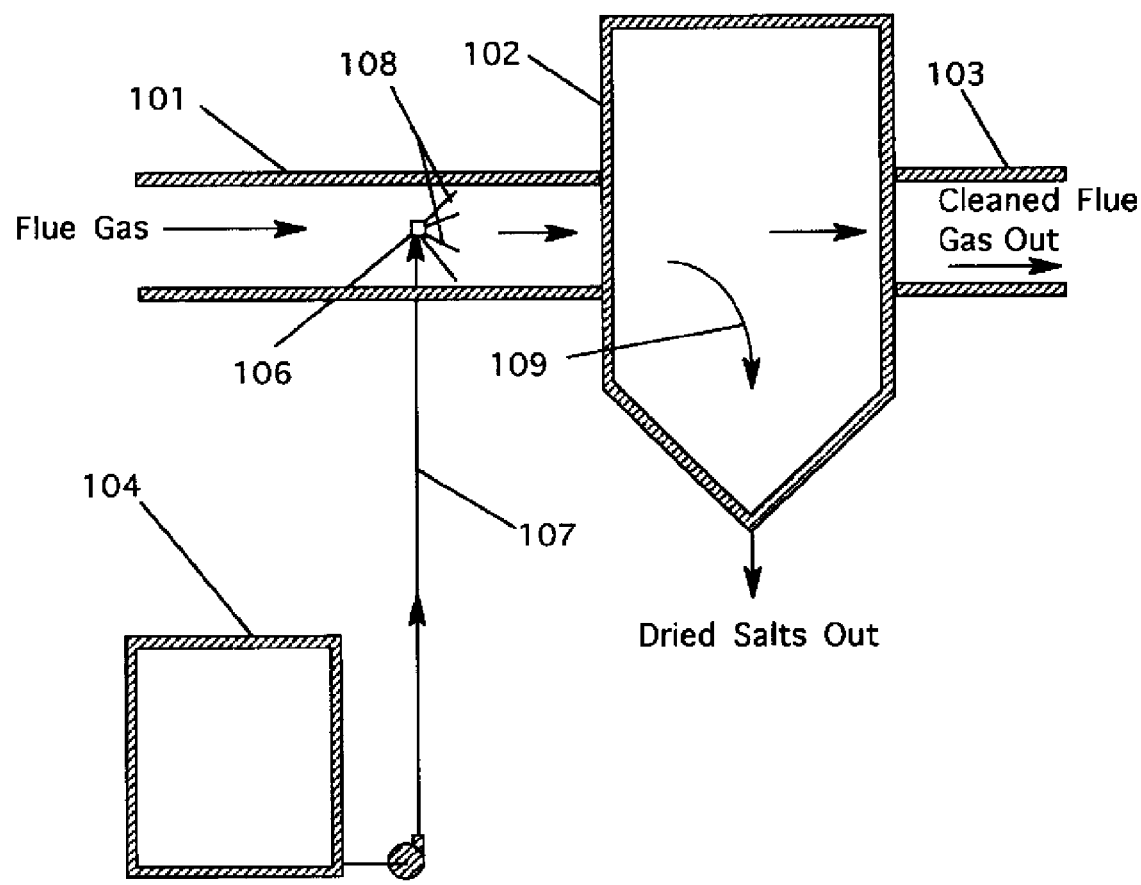
FIGS. 1 and 2 schematically represent processes and equipment for carrying out the invention, and represent two locations at which solutions of this invention can be injected.
Figure 2:
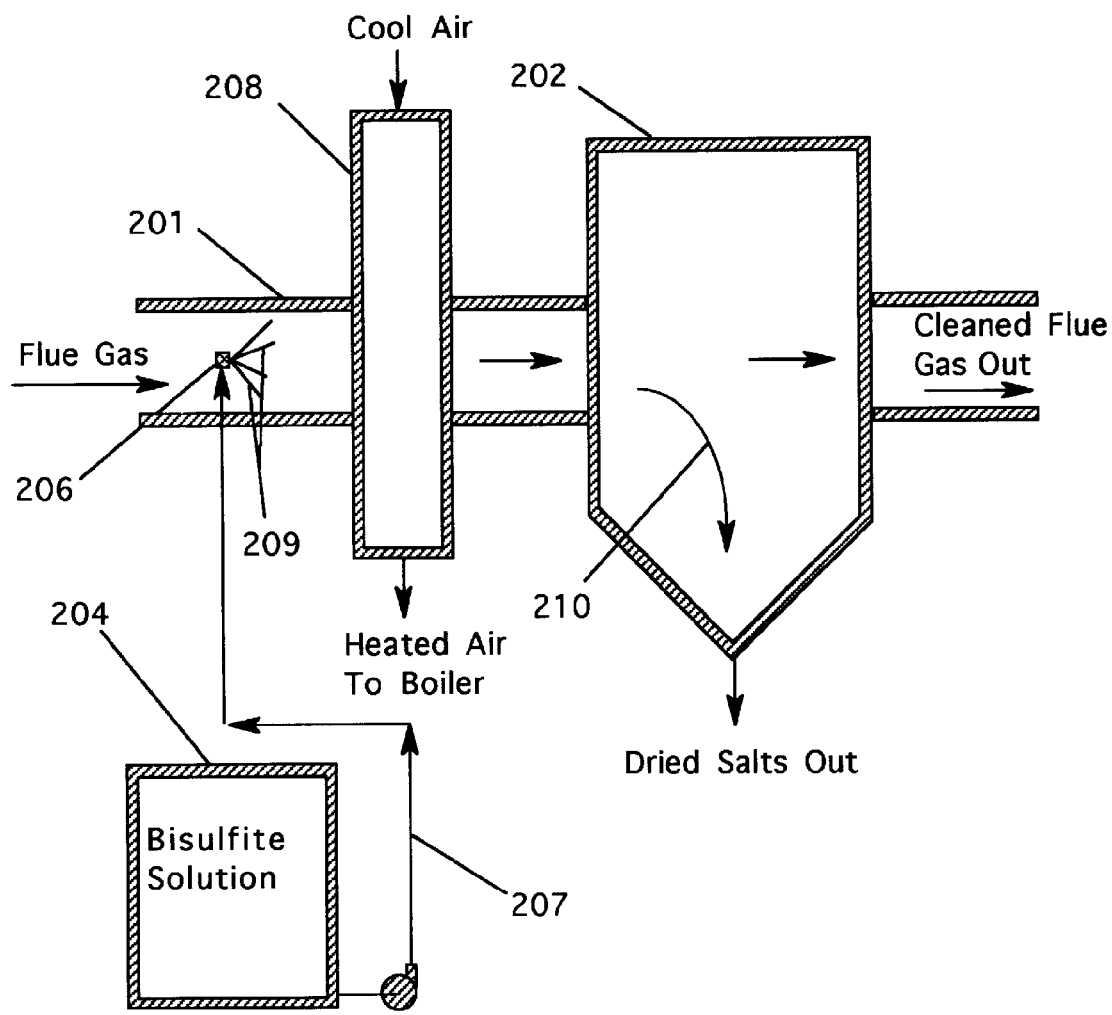

The present invention resulted from investigations directed to finding alternative reagents for removing $SO_3$ and $H_2SO_4$ vapors from flue gas streams. The invention employs aqueous thiosulfate and chloride salt solutions using a spray dispersion technique that allows complete evaporation of the water present in the solution. By specifying the droplet size, the operator can assure evaporation before the spray comes into contact with equipment surfaces.

During investigations leading to the present invention, data obtained with the use of sodium sulfite/bisulfite solutions to remove $SO_3$ and $H_2SO_4$ vapors from a flue gas suggested that in some cases the ratio of sodium to removed $SO_3$ was less than the theoretical value of two. It was concluded that a sodium sulfate reaction product or a sodium sulfate impurity associated with the sodium sulfite/bisulfite solutions was also reacting with $SO_3/H_2SO_4$. As an extension of this conclusion, it was theorized that thiosulfates may be similarly effective to react with $SO_3$ or $H_2SO_4$ on the basis that thiosulfates have chemical properties between sulfites and sulfates. Thiosulfate compounds believed to be effective in removing $SO_3$ and $H_2SO_4$ vapors include sodium thiosulfate ($Na_2S_2O_3$), magnesium thiosulfate ($MgS_2O_3$), potassium thiosulfate ($K_2S_2O_3$), ammonium thiosulfate ($(NH_4)_2S_2O_3$), and calcium thiosulfate ($CaS_2O_3$).

In addition to reacting directly with $SO_3/H_2SO_4$, it was theorized that thiosulfates could react with $SO_2$ to form bisulfites, leading to the ability to react with $SO_3/H_2SO_4$ in accordance with Wilhelm et al. As chloride solutions can also absorb $SO_2$ to produce bisulfite species, it was further theorized that chloride compounds could also be effective in removing $SO_3$ and $H_2SO_4$ vapors. Particularly suitable chlorides for this purpose are believed to include sodium chloride (NaCl), magnesium chloride ($MgCl_2$), potassium chloride (KCl), ammonium chloride ($NH_4Cl$), and calcium chloride ($CaCl_2$).

In FIG. 1, a flue gas containing acidic gases flows through a duct 101 toward the wet scrubber FGD in a power plant. An aqueous solution containing one or more dissolved thiosulfate or chloride reagents of this invention is held in a container 104. The solution contains the reagent(s) in an amount capable of achieving complete dispersion and drying on contact with the flue gas. The solution is pumped through a pipe 107 to the duct 101, where the solution is introduced as a fine mist or spray 108 with a spray nozzle 106. The nozzle 106 dispenses the aqueous solution to have a droplet size that lends itself to maximum encapsulation of the flue gas vapors, as well as allows rapid evaporation so the resulting dried particles of the thiosulfate or chloride species are sufficiently small to maximize reaction with and effectively remove the corrosive $SO_3$ or $H_2SO_4$ acid gases from the flue gas. As an example, if the reagent is sodium thiosulfate, the resulting reaction products are sodium sulfate, sulfur dioxide, and sulfur vapor in proportion to the relative amounts of each species reacted. The resultant dry salt particles 109 drop from the flue gas stream and are collected in a particulate matter control device 102 along with any fly ash suspended in the flue gases. From the particulate matter control device 102, the sodium dioxide and remainder of the flue gas continues through a second duct 103 to the downstream FGD, where $SO_2$ is scrubbed and removed with any suitable equipment and process.

Similar to the embodiment of FIG. 1, FIG. 2 represents an embodiment in which a container 204 containing an aqueous solution of one or more of the dissolved reagents of this invention. As before, the solution contains the reagent(s) in an amount capable of achieving complete dispersion and drying on contact with the flue gas. The solution is pumped through a pipe 207 to a duct 201, where the solution is introduced with a spray nozzle 206 as a mist or spray 209 whose droplet size lends itself to maximum encapsulation of the flue gas vapors. In contrast to the first embodiment of the invention, the embodiment of FIG. 2 shows the spray droplets as being injected into a gas duct upstream of a boiler air preheater 208. As a result, the hot flue gas and dried sulfate particulates produced as a result of the removal of $SO_3/H_2SO_4$ with the reagents of this invention pass through the preheater 208, where the gas is cooled prior to entering a particulate matter control device 202, such as a bag house or ESP. Once in the control device 202, final separation and removal of the dried particulates 210 yields a clean flue gas that continues downstream toward a FGD.

In view of the above, the present invention provides a process related to some respects of U.S. Pat. No. 6,126,910 to Wilhelm et al., which describes the use of sulfite/bisulfite solutions to remove $SO_3$ and HCl. With the present invention, thiosulfate and chloride salt solutions are believed to react efficiently with the targeted $SO_3$ and $H_2SO_4$ acid gases following injection and drying on contact with the flue gas. According to one aspect of the invention, prior to drying of the fine spray droplets, some $SO_2$ may be absorbed into the droplets and react to form bisulfites. Upon drying, the resulting solids will consist of a mixture of sulfite and thiosulfate or chloride salts, the relative amounts of which will be determined by the extent of $SO_2$ absorption prior to the evaporation of the injected mist. These dried solids then react with $SO_3$ and $H_2SO_4$ to form solid sulfate particles.

The chemistries of the reactions occurring with the present invention are summarized in the following equations. The sodium reactions are representative of reactions for other salt species including potassium and ammonium, while the calcium reactions are representative for reactions for magnesium salts.

$$Na_2SO_3+SO_3 \rightarrow Na_2SO_4+SO_2 \quad (1)$$

and, $$Na_2S_2O_3+SO_3 \rightarrow Na_2SO_4+SO_2+S \quad (2)$$

or, $$Na_2SO_3+H_2SO_4 \rightarrow Na_2SO_4+H_2O+SO_2 \quad (3)$$

and, $$Na_2S_2O_3+H_2SO_4 \rightarrow Na_2SO_4+H_2O+SO_2+S \quad (4)$$

$$CaSO_3+SO_3 \rightarrow CaSO_4+SO_2 \quad (5)$$

and, $$Ca_2S_2O_3+SO_3 \rightarrow CaSO_4+SO_2+S \quad (6)$$

or, $$CaSO_3+H_2SO_4 \rightarrow CaSO_4+H_2O+SO_2 \quad (7)$$

and, $$Ca_2S_2O_3+H_2SO_4 \rightarrow CaSO_4+H_2O+SO_2+S \quad (8)$$

$$2NaCl+SO_3+H_2O \rightarrow Na_2SO_4+2HCl \quad (9)$$

or, $$2NaCl + H_2SO_4 \rightarrow Na_2SO_4 + 2HCl \qquad (10)$$

$$CaCl_2 + SO_3 + H_2O \rightarrow CaSO_4 + 2HCl \qquad (11)$$

or, $$CaCl_2 + H_2SO_4 \rightarrow CaSO_4 + 2HCl \qquad (12)$$

The addition of either thiosulfate or chloride salt solutions in accordance with this invention upstream of an air preheater section of a coal or oil-fired boiler system provides several advantages. The removal of acid vapor present in power plant flue gas streams minimizes corrosion of downstream equipment. If not removed, sulfuric acid mist can condense on the surfaces of the preheater and downstream duct work, ash collection equipment, etc. The reduced threat of corrosion achieved with this invention also broadens the choices for downstream equipment materials of construction. Plant economics can be improved by using cheaper materials, such as reducing the requirement for corrosion-resistant high nickel alloys.

Another advantage is that boiler efficiency can be improved with greater heat recovery from a preheater. Typically, air preheater temperatures are limited by the heat required to keep the acid gases above the sulfur acid dew point. Flue gas temperatures below the sulfur acid dew point undesirably allow sulfuric acid vapor to condense on equipment surfaces, thus increasing the risk of corrosion. By removing $SO_3$ and $H_2SO_4$ acid gases in accordance with the invention, the risk of acid gas condensation is essentially eliminated, and air preheaters can be allowed to remove more heat from the flue gas and recycle it back to the boiler, effectively decreasing boiler heat loss to the atmosphere.

The invention also makes higher fly ash removal rates possible as a result of $SO_3$ and $H_2SO_4$ acid gases precipitating to dry salts. Fly ash is normally present in the flue gas stream and needs to be minimized prior to exiting the stack to atmosphere. Improved fly ash removal in electrostatic precipitators can be achieved with this invention because the dry salts are imbedded into the fly ash. Furthermore, fly ash conditioning occurs as a result of improved surface resistance of the fly ash particles through contact with the injected solution.

Yet another advantage is that the reduction of $SO_3$ and $H_2SO_4$ acid gases in a flue gas will help to reduce visible sulfuric acid plume emissions. The plume begins with the formation of sulfuric acid mist in the quench zone of wet $SO_2$ scrubber systems. The mist has a particle size that is generally in the submicron range, and aerosols in this size range will efficiently penetrate most FGD scrubbers. The ability to reduce the concentration of emitted sulfuric acid to levels below 2 to 5 ppmv will typically eliminate acid plume visibility conditions. By minimizing the $SO_3$ concentration, the sulfuric acid plume can be essentially eliminated.

While the invention has been described in terms of specific embodiments, it is apparent that other forms could be adopted by one skilled in the art. Accordingly, it should be understood that the invention is not limited to the specific embodiments described and illustrated in the Figures. It should also be understood that the phraseology and terminology employed above are for the purpose of disclosing the embodiments, and do not necessarily serve as limitations to the scope of the invention. Instead, the scope of the invention is to be limited only by the following claims.

The invention claimed is:

1. A method of removing an acid gas from a flue gas, the acid gas being at least one of $SO_3$ and $H_2SO_4$, the method comprising spraying into a moving volume of the flue gas an aqueous solution containing at least one of sodium, magnesium, potassium, ammonium, and calcium thiosulfate and containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing the acid gas from the flue gas.

2. The method according to claim 1, wherein the acid gas is $SO_3$ and $H_2SO_4$.

3. The method according to claim 1, wherein the aqueous solution contains at least one of sodium, magnesium, potassium, ammonium, or calcium chloride.

4. The method according to claim 1, wherein the aqueous solution consists essentially of water and the at least one soluble salt compound.

5. The method according to claim 1, wherein the aqueous solution consists of water and the at least one soluble salt compound.

6. The method according to claim 1, wherein the dry particles react with the acid gas to form solid sulfates, the method further comprising the step of extracting the solid sulfates from the flue gas with a particulate control system.

7. A method of removing an acid gas from a flue gas, the method comprising:
spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing the acid gas from the flue gas; and
wet scrubbing the flue gas to remove $SO_2$ downstream from the spraying step.

8. A method of removing an acid gas from a flue gas, the method comprising:
spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing the acid gas from the flue gas; and
flowing the flue gas through an air preheater downstream from the spraying step.

9. A method of removing an acid gas from a flue gas, the method comprising spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing the acid gas from the flue gas, wherein prior to drying, the droplets of the aqueous solution absorb $SO_2$ from the flue gas to form a bisulfite species, and upon drying of the droplets the dry particles contain the bisulfite species and the bisulfite species reacts with and removes the acid gas.

10. The method according to claim 9, wherein the aqueous solution contains at least one of sodium, magnesium, potassium, ammonium, or calcium thiosulfate.

11. A method comprising the steps of:
spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing from the flue gas at least one acid gas chosen from the group consisting of $SO_3$ and $H_2SO_4$; and then scrubbing the flue gas to remove $SO_2$ therefrom;

wherein prior to drying, the droplets of the aqueous solution absorb $SO_2$ from the flue gas to form a bisulfite species, and upon drying of the droplets the dry particles contain the bisulfite species and the bisulfite species reacts with and removes the acid gas.

12. The method according to claim 11, wherein the aqueous solution contains at least one of sodium, magnesium, potassium, ammonium, or calcium chloride.

13. The method according to claim 11, wherein the dry particles react with the acid gas to form solid sulfates, the method further comprising the step of extracting the solid sulfates from the flue gas with a particulate control system.

14. A method comprising the steps of:

spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing from the flue gas at least one acid gas chosen from the group consisting of $SO_3$ and $H_2SO_4$; and then scrubbing the flue gas to remove $SO_2$ therefrom;

wherein the aqueous solution contains at least one of sodium, magnesium, potassium, ammonium, or calcium thiosulfate.

15. A method comprising the steps of:

spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing from the flue gas at least one acid gas chosen from the group consisting of $SO_3$ and $H_2SO_4$; and then scrubbing the flue gas to remove $SO_2$ therefrom;

wherein the aqueous solution contains sodium thiosulfate.

16. A method comprising the steps of:

spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing from the flue gas at least one acid gas chosen from the group consisting of $SO_3$ and $H_2SO_4$; and then scrubbing the flue gas to remove $SO_2$ therefrom;

wherein the aqueous solution consists essentially of water and the at least one soluble salt compound.

17. A method comprising the steps of:

spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing from the flue gas at least one acid gas chosen from the group consisting of $SO_3$ and $H_2SO_4$; and then scrubbing the flue gas to remove $SO_2$ therefrom;

wherein the aqueous solution consists of water and the at least one soluble salt compound.

18. A method comprising the steps of:

spraying into a moving volume of the flue gas an aqueous solution containing at least one soluble salt compound chosen from the group consisting of thiosulfate and chloride species, the aqueous solution being sprayed to produce droplets that dry on contact with the flue gas to form dry particles of the at least one soluble salt compound, the dry particles reacting with and removing from the flue gas at least one acid gas chosen from the group consisting of $SO_3$ and $H_2SO_4$;

flowing the flue gas through an air preheater; and then scrubbing the flue gas to remove $SO_2$ therefrom.

19. The method according to claim 18, wherein prior to drying, the droplets of the aqueous solution absorb $SO_2$ from the flue gas to form a bisulfite species, and upon drying of the droplets the dry particles contain the bisulfite species and the bisulfite species reacts with and removes the acid gas.

* * * * *